US012584439B1

(12) United States Patent
Heckaman

(10) Patent No.: US 12,584,439 B1
(45) Date of Patent: Mar. 24, 2026

(54) TURBOCHARGER CONTROLS

(71) Applicant: Cummins Inc., Columbus, IN (US)

(72) Inventor: Bryce A. Heckaman, Chapel Hill, NC (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 19/040,632

(22) Filed: Jan. 29, 2025

(51) Int. Cl.
*F02M 26/02* (2016.01)
*F02B 37/12* (2006.01)
*F02B 37/24* (2006.01)

(52) U.S. Cl.
CPC ............ *F02B 37/24* (2013.01); *F02M 26/02* (2016.02); *F02B 2037/122* (2013.01)

(58) Field of Classification Search
CPC ... F02B 37/24; F02B 2037/122; F02M 26/02; F02M 26/05
See application file for complete search history.

(56) References Cited

U.S. PATENT DOCUMENTS 6,035,640 A * 3/2000 Kolmanovsky ......... F02D 21/08 60/605.2
6,125,830 A 10/2000 Kotwicki et al.
8,061,137 B2 11/2011 Evans
8,640,679 B2 2/2014 Wang et al.
11,788,461 B2 10/2023 Baramov
11,815,010 B2 11/2023 Dixon et al.

FOREIGN PATENT DOCUMENTS

EP 1178192 A2 * 2/2002 ......... F02D 41/0065

* cited by examiner

*Primary Examiner* — Ngoc T Nguyen
(74) *Attorney, Agent, or Firm* — Taft, Stettinius & Hollister LLP

(57) ABSTRACT

A process includes operating an electronic control system to control operation of an engine system. The operating includes operating the engine at an engine speed and an EGR fraction and the turbocharger within a steady state speed limit, in response to the engine speed and the EGR fraction, setting an actuator limit on position of the turbine actuator, and in response to a change in one or both of the speed of the engine and the EGR fraction, proactively adjusting the turbine actuator according to the actuator limit prior to an increase in turbocharger speed, the adjusting limiting turbocharger speed overshoot relative to a speed limit.

20 Claims, 11 Drawing Sheets

TURBOCHARGER CONTROLS

TECHNICAL FIELD

The present application relates to turbocharger controls and related apparatuses, systems, and processes.

BACKGROUND

Existing approaches to turbocharger controls suffer from a number of disadvantages, shortcomings, and unmet needs including those respecting, accuracy, precision, efficacy, performance, responsiveness, and reliability, among others. There remain significant needs for the unique apparatuses, processes, and systems disclosed herein.

DISCLOSURE OF EXAMPLE EMBODIMENTS

For the purposes of clearly, concisely, and exactly describing example embodiments of the present disclosure, the manner, and process of making and using the same, and to enable the practice, making and use of the same, reference will now be made to certain example embodiments, including those illustrated in the figures, and specific language will be used to describe the same. It shall nevertheless be understood that no limitation of the scope of the invention is thereby created, and that the invention includes and protects such alterations, modifications, and further applications of the example embodiments as would occur to one skilled in the art.

SUMMARY OF THE DISCLOSURE

Some embodiments include apparatuses including unique turbocharger controls. Some embodiments include unique processes including unique turbocharger controls. Some embodiments include unique systems including unique turbocharger controls. Further embodiments, forms, objects, features, advantages, aspects, and benefits shall become apparent from the following description and drawings.

DETAILED DESCRIPTION OF EXAMPLE EMBODIMENTS

Figure 1:
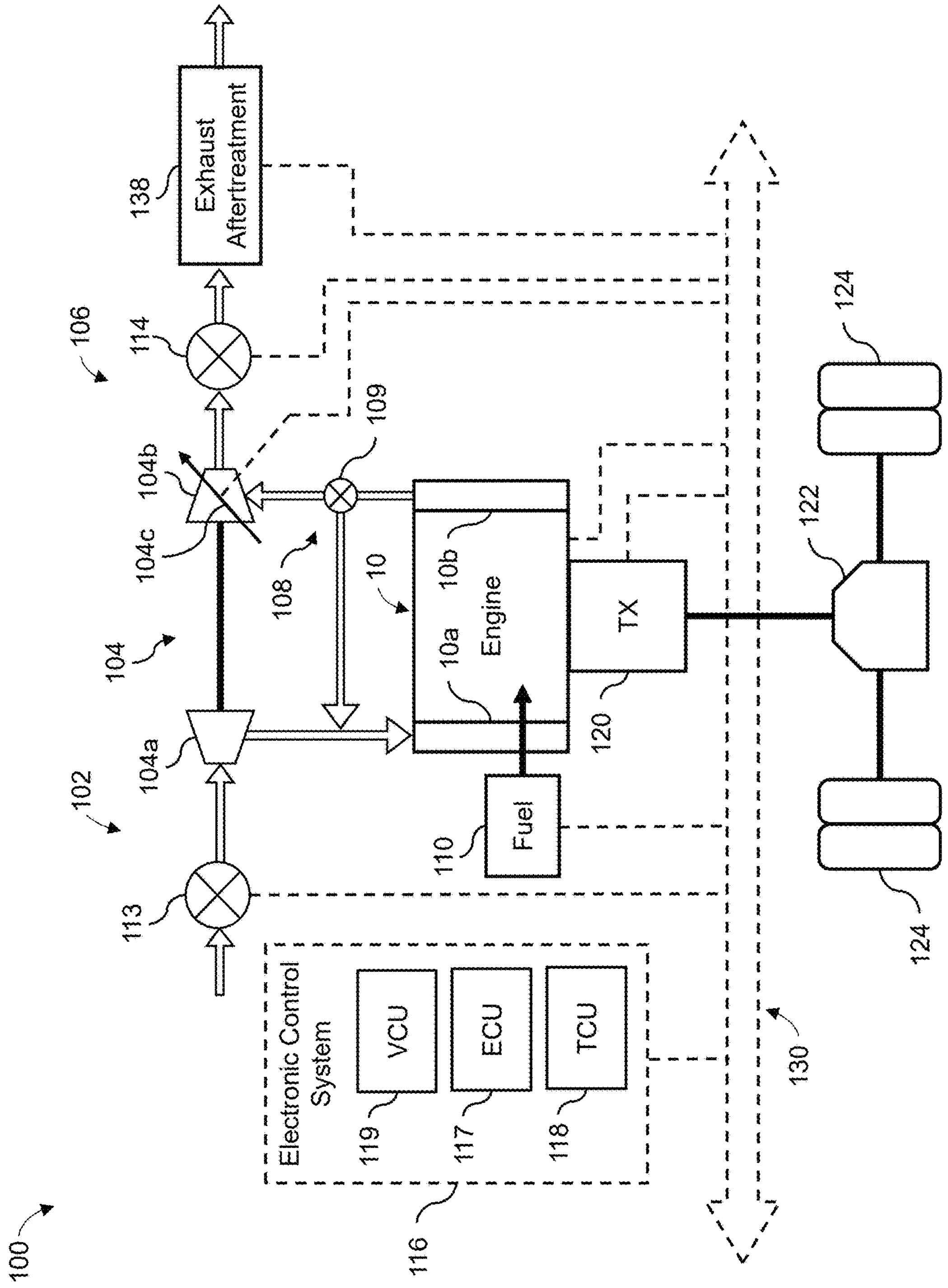
FIG. 1 is a schematic diagram depicting certain aspects of an example vehicle system.

With reference to FIG. 1, there is illustrated a vehicle system 100 (also referred to herein as system 100) according to one example embodiment. System 100 includes an engine 10 having an intake manifold 10*a* and an exhaust manifold 10*b*. System 100 further includes an intake system 102 fluidly coupled to the intake manifold 10*a* and configured to receive compressed intake gases from compressor 104*a* of a turbocharger 104. In the illustrated embodiment, turbocharger 104 includes an exhaust-driven turbine 104*b*.

In the illustrated example, turbocharger 104 is configured and provided in the form of a variable geometry turbocharger (VGT) including an actuator 104*c* configured and operable to vary the geometry and performance of exhaust-driven turbine 104*b*, for example, by adjusting position of one or more actuatable vanes, adjusting position of an actuatable sliding wall, or adjusting position of an actuatable flow gate to vary flow portion between two or more flow passages, or in other manners as will occur to one of skill in the art with the benefit and insight of the present disclosure. It shall be appreciated that actuator 104*c* is one example of a turbine actuator according to the present disclosure. Other embodiments may include other types of turbine actuators including for example, an electronically controlled wastegate or e-wastegate configured to selectably control exhaust flow to the turbine 104*b* or to bypass the turbine 104*b*, an exhaust throttle such as exhaust throttle 114, a turbine bypass valve, a rotary turbine controller, or other types of turbine actuators as will occur to one of skill in the art with the benefit and insight of the present disclosure.

System 100 includes an EGR system 108 which is configured as a high-pressure loop EGR system. The EGR system 108 includes an EGR valve 109 which may be positioned at a number of locations in the exhaust system 106 and operated to control recirculation of exhaust gasses output by the engine 10 to the intake of engine 10.

System 100 also includes an exhaust aftertreatment system 138 which receives exhaust from engine 10 via other elements of exhaust system 106. Exhaust aftertreatment system 138 may include one or more catalysts for mitigation of emissions including, for example, hydrocarbons, NOx, or particulates.

System 100 includes an intake throttle 113 and an exhaust throttle 114. Intake throttle 113 is controllable to selectably vary intake charge flow to intake manifold 10*a* of engine 10. In the illustrated example, intake throttle 113 is positioned upstream of compressor 104*a* of turbocharger 104. In other embodiments, intake throttle 113 may be positioned in other locations upstream of intake manifold 10*a* of engine 10.

Exhaust throttle 114 is controllable to selectably vary exhaust flow from exhaust manifold 10*b* of engine 10 and to selectably vary exhaust backpressure. In the illustrated example, exhaust throttle 114 is positioned downstream of turbine 104*b* of turbocharger 104. In other embodiments, exhaust throttle 114 may be positioned in other locations downstream of exhaust manifold 10*b* of engine 10. In some embodiments, exhaust throttle may be integral to a turbocharger turbine, such as in the cases of a variable geometry turbocharger configured to provide engine braking.

It shall be appreciated that intake throttle 113 and exhaust throttle 114 are examples of throttle valves that may be controlled to provide engine braking and to brake the engine. In the illustrated example, either intake throttle 113 or exhaust throttle 114 can be controlled to individually provide engine braking. Additionally, both intake throttle 113 and exhaust throttle 114 may be controlled in conjunction (in parallel or sequentially) to provide combined engine braking. Some embodiments may include only one of exhaust throttle 114 and an intake throttle 113. Furthermore, some embodiments may include additional or alternative engine throttles that may be controlled to provide engine braking and to brake the engine.

System 100 includes a transmission 120 which may be provided in a number of forms and configurations including, for example, an automated manual transmission (AMT), an automatic transmission, a continuously variable transmission, a manual transmission, or another type of transmission as will occur to one of skill in the art with the benefit and insight of the present disclosure. Transmission 120 receives torque output by engine 10 and provides output torque to differential 122. In turn, differential 122 outputs torque to drive wheels 124 to propel 100. Transmission 120 is controllable to perform gear shift operations to vary the gear ratio between an input shaft operatively coupled with engine 10 and an output shaft operatively coupled with differential 122.

System 100 includes a fuel system 110 operationally coupled with and configured to provide fuel to engine 10. Fuel system 110 may be provided in a number of forms, for example, a natural gas system, a hydrogen gas fuel system, or gaseous fuel systems configured an operabel to combust other types or blends of gaseous fuels, a gasoline system, or a dual-fuel system. When provided as a dual fuel system, fuel system 110 may be configured to provide multiple fuels to the combustion chamber, for example, gaseous fuel and liquid fuel. In such systems, combustion may be controlled by injection of the liquid fuel to the combustion cylinder to ignite the gaseous fuel. Fuel system 110 may utilize port fuel injection and/or direct injection.

System 100 includes an electronic control system (ECS) 116 which includes control circuitry configured to control a number of operational aspects of system 100. The control circuitry of ECS 116 may be provided in a number of forms and combinations. In some embodiments, the control circuitry of ECS 116 may be provided in whole or in part by one or more microprocessors, microcontrollers, other integrated circuits, or combinations thereof which are configured to execute instructions stored in a non-transitory memory medium, for example, in the form of stored firmware and/or stored software. It shall be appreciated microprocessor, microcontroller and other integrated circuit implementations of the control circuitry disclosed herein may comprise multiple instances of control circuitry which utilize common physical circuit elements. For example, first control circuitry may be provided by a combination of certain processor circuitry and first memory circuitry, and second control circuitry may be provided by a combination of, at least in part, that certain processor circuitry and second memory circuitry differing from the first memory circuitry.

It shall be further appreciated that the control circuitry of ECS 116 may comprise other digital circuitry, analog circuitry, hybrid analog-digital circuitry, or combinations thereof. Some non-limiting example elements of such circuitry include application specific integrated circuits (ASICs), arithmetic logic units (ALUs), amplifiers, analog calculating machine(s), analog to digital (A/D) and digital to analog (D/A) converters, clocks, communication ports, field programmable gate arrays (FPGAs), filters, format converters, modulators or demodulators, multiplexers and de-multiplexers, non-transitory memory devices and media, oscillators, processors, processor cores, signal conditioners, state machine(s), and timers. As with microprocessor, microcontroller, and other integrated circuit implementations, such alternate or additional implementations may implement or utilize multiple instances of control circuitry which utilize common physical circuit elements. For example, first control circuitry may be provided by a combination of first control circuitry elements and second control circuitry elements, and second control circuitry may be provided by a combination of the first control circuitry elements and third control circuitry elements differing from the first control circuitry elements.

ECS 116 may be provided as a single component or a collection of operatively coupled components. When of a multi-component form, ECS 116 may have one or more components remotely located relative to the others in a distributed arrangement and may distribute the control function across one or more control units or devices. In the illustrated example, ECS 116 includes multiple electronic control units including an engine control unit (ECU) 117, a transmission control unit (TCU) 118, and a vehicle control unit (VCU 119). In general, ECU 117, TCU 118, and VCU 119 are configured to respectively control engine 10, transmission 120, and other systems of system 100. ECU 117, TCU 118, and VCU 119 are also configured to operatively communicate with one another over one or more networks 130 such as one or more controller area networks (CANs) and may also be configured to communicate with various systems, devices, and sensors of system 100 via dedicated communication links. Example communication connections are illustrated in FIG. 1, although in any given embodiment connections illustrated may not be present, and/or additional connections may be present.

Figure 2:
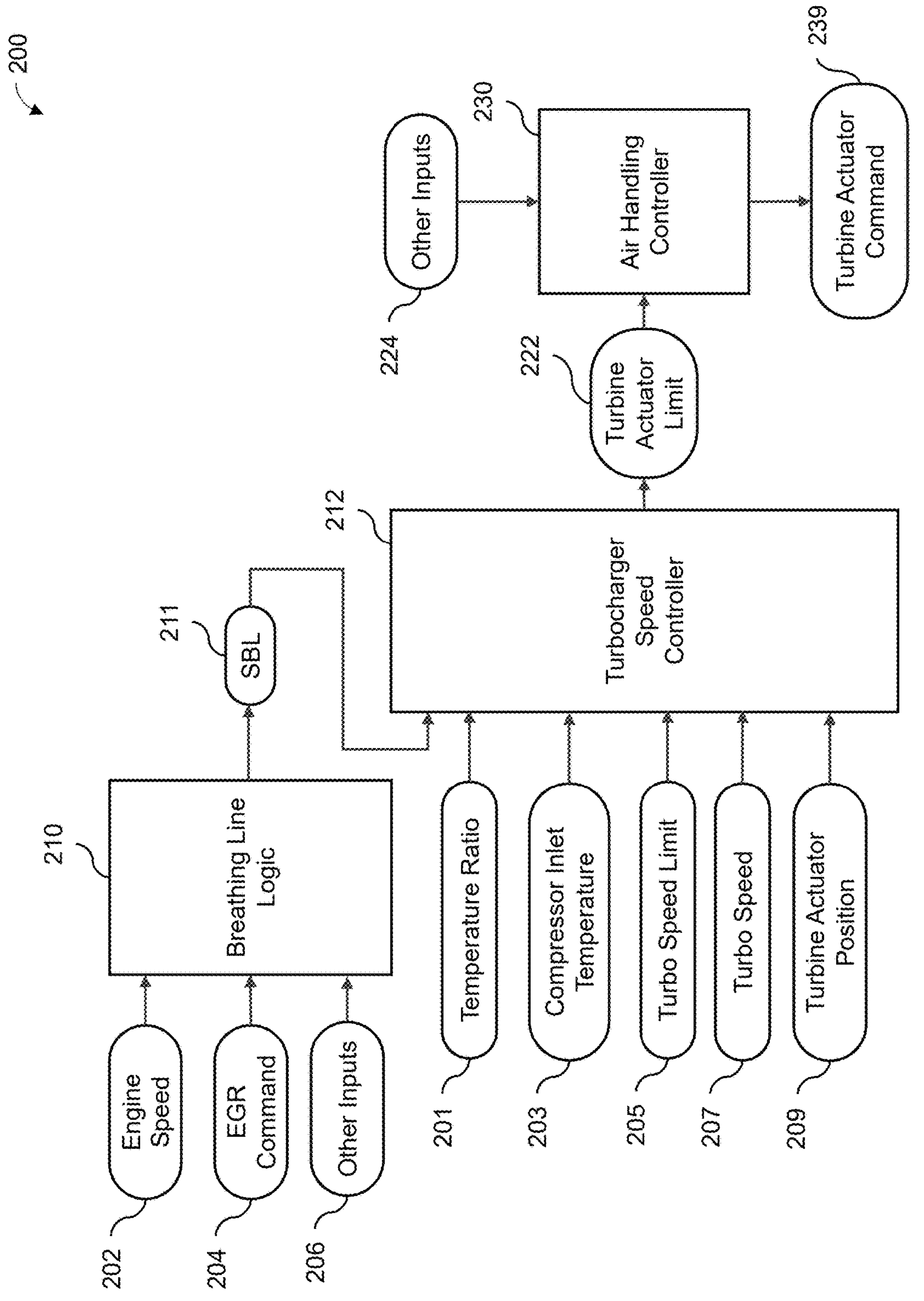
FIGS. 2-7 are schematic diagrams depicting certain aspects of example controls.

With reference to FIG. 2 there are illustrated example controls 200 which may be implemented in and operated by an electronic control system such as ECS 116 or another electronic control system. In shall be appreciated that controls 200 may be implemented in and executed by one or more electronic control units. Controls 200 may, for example, be implemented in and executed using one or more microcontrollers and/or other various other integrated-circuit-based processing circuitry in combination with or including one or more non-transitory memory media configured to store various parameters and executable instructions and that such structures may be referred to herein as logic.

Controls 200 include breathing line logic 210 (also referred to herein as logic 210) which is configured to receive as inputs engine speed 202, EGR command 204, and, in some embodiments, one or more other inputs 206. In response to these inputs, logic 210 is configured to determine and output slope of breathing line (SBL) parameter 211 which is provided as input to turbocharger speed controller 212. SBL parameter 211 represents the volumetric flow that is passing through a turbocharger turbine or compressor and is proportional to engine speed and inversely proportional to EGR fraction. It shall be appreciated that breathing line parameters other than breathing line slope may be utilized by controls 200. Such breathing line parameters may include, for example, line angles, trigonometric line parameters, or the reciprocal or inverse of the slope of breathing line.

Turbocharger speed controller 212 may be configured to implement a combination of a compensator component and an integrator component. The compensator component may be configured in accordance with equation (1), and the integrator component may be configured in accordance with equation (2), wherein $$K_p = TurboSpeedPGain \cdot \frac{dTurbineSize}{dTurboSpeed},$$

$$K_i = TurbineSpeedIGain \cdot \frac{dTurbineSize}{dTurboSpeed},$$

$$K_d = TurboSpeedDGain \cdot \frac{dTurbineSize}{dTurboSpeed},\ K_{d2} = SBLDGain \cdot \frac{dTurbineSize}{dSBL},$$

$$Err(t) = \text{turbocharger speed limit} - \text{turbocharger speed},$$

$$\text{and Trim} = \text{turbine actuator limit adjustment.}$$

$$\frac{dTrim}{dt} = \frac{d(K_p \times Err(t))}{dt} + K_i \times Err(t) + K_d \times \frac{dTS(t)}{dt} + K_{d2} \times \frac{dSBL(t)}{dt} \quad (1)$$

-continued $$\text{Trim} = \int \frac{dTrim}{dt} dt \tag{2}$$

It shall be appreciated that SBL derivative controller gain (SBLDGain) may be utilized to dampen changes in turbocharger speed caused by changes in engine speed or EGR. Additionally, by coupling an SBL derivative term $$\left(\frac{dSBL(t)}{dt}\right)$$

with a linearization factor that relates change in SBL to a change in VGT $$\left(\frac{dTurbineSize}{dSBL}\right),$$

turbocharger speed controller 212 can adjust the VGT position predictively and/or proactively (before a change in turbocharger speed is observed or occurs). Such predictive and/or proactive capability is effective to reduce turbocharger speed overshoots/undershoots caused by sudden changes in engine speed or EGR.

Breathing line logic 210 may be configured to determine SBL parameter 211 in accordance with equation (3), wherein $\eta_{vol}$=Volumetric Efficiency, R=Specific Gas Constant for air=286.9 J/kg/K, $T_{im}$=Intake Manifold Temperature (K), $T_{cac}$=CAC Outlet Temperature (K), Ω=Engine Speed (RPM), D=Displacement volume of the engine (L), $A_{eff}$=Effective Flow Area of the intake system ($cm^2$)· $m_{corr}$=Corrected Mass Air Flow (kg/s), $PR_{comp}$=Pressure Ratio across the compressor, $T_{ci}$=Compressor Inlet Temperature (K), $f_{egr}$=EGR Fraction.

$$SBL = \frac{m_{corr}}{PR_{comp}} = \frac{\sqrt{T_{ci}}}{10.358}\left(\frac{2RT_{im}}{(1-f_{eqr})\eta_{vol}\Omega D} + \frac{T_{cac\_out}}{T_{im}}\frac{(1-f_{egr})\eta_{vol}\Omega D}{144A_{eff}^2}\right)^{-1} \tag{3}$$

Turbocharger speed controller 212 is also configured to receive, temperature ratio 201 (which is a ratio of exhaust manifold temperature to compressor inlet temperature), compressor inlet temperature 203, turbocharger speed limit 205, turbocharger speed 207, and turbine actuator position 209, in addition to SBL parameter 211. In response to these inputs, turbocharger speed controller 212 is configured to determine and output turbine actuator limit 222 which is provided as input to air handling controller 230.

Air handling controller 230 is also configured to receive other inputs, in addition to turbine actuator limit 222, and, in some embodiments, one or more other inputs 224, in addition to turbine actuator limit 222. In response to these inputs, air handling controller determines and outputs turbine actuator command 239 and may also determine a number of other commands and parameters relating to intake air handling including, for example, throttle commands, and other commands and parameters as will occur to one of skill in the art with the benefit and insight of the present disclosure. Turbine actuator command 239 is configured and may be utilized by controls 200 to command operation of a turbine actuator such as a VGT actuator or other type of turbine actuator.

It shall be appreciated that configuring a turbocharger speed controller to provide a turbine actuator limit rather than an ultimate turbine actuator command facilitates straightforward integration with a variety of air handling controller architectures. The configuration of controls 200 likewise supports application to a variety of turbine actuator architectures including electronically controlled wastegates or e-wastegates, exhaust throttles, a turbine bypass valves, rotary turbine controllers, or other types of turbine actuators as will occur to one of skill in the art with the benefit and insight of the present disclosure.

Figure 3:
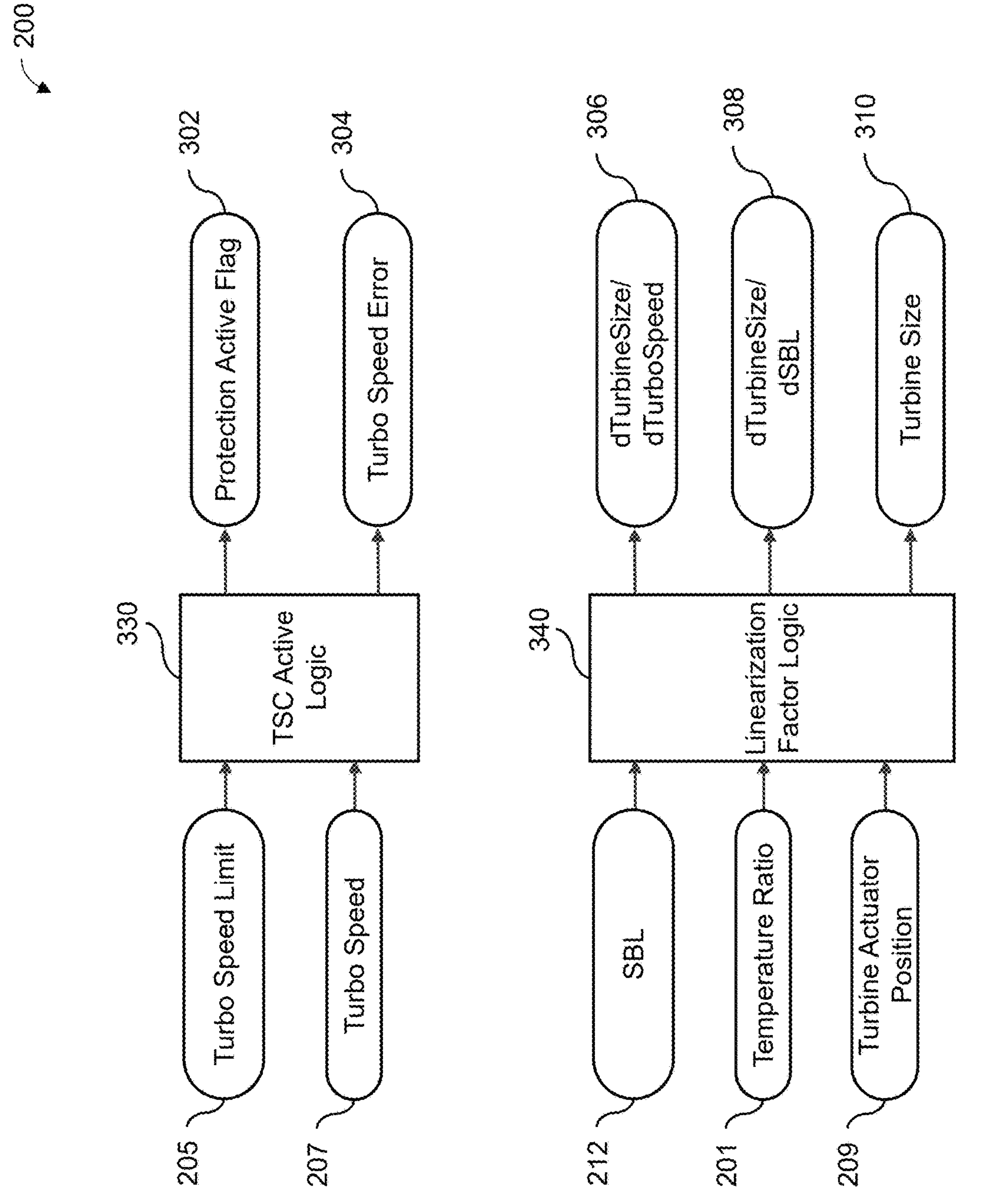

With reference to FIG. 3 there are illustrated additional aspects of controls 200. TSC active logic 330 is configured to receive as input turbocharger speed 207 and turbocharger speed limit 205. In response to these inputs, TSC active logic 330 determines whether and when to active turbocharger speed control protection, for example, by evaluating whether turbocharger speed 207 exceeds turbocharger speed limit 205 or based on another predetermined relationship between turbocharger speed 207 and turbocharger speed limit 205. In response to such determination, TSC active logic 330 is configured to determine and output protection active flag 302 and turbocharger speed error 304.

Linearization factor logic 340 is configured to receive as input SBL parameter 211, temperature ratio 201, and turbine actuator position 209. In response to these inputs, TSC active logic 330 determines and provides as output a linearization factor 306 correlating changes in turbine size with changes in turbocharger speed 207 (e.g., dTurbineSize/dTurboSpeed). It shall be appreciated that changes in turbine size comprise changes in effective size or physical size resulting from operation of a VGT actuator or another turbine actuator. In response to these inputs, TSC active logic 330 also determines and provides as output linearization factor 308 correlating changes in turbine size with changes in SBL parameter 211 (e.g., dTurbineSize/dSBL), and determines and provides as output turbine size 310. Linearization factor logic 340 may utilize the controls aspects illustrated and describe in connection with FIG. 4 In making such determinations.

Figure 4:
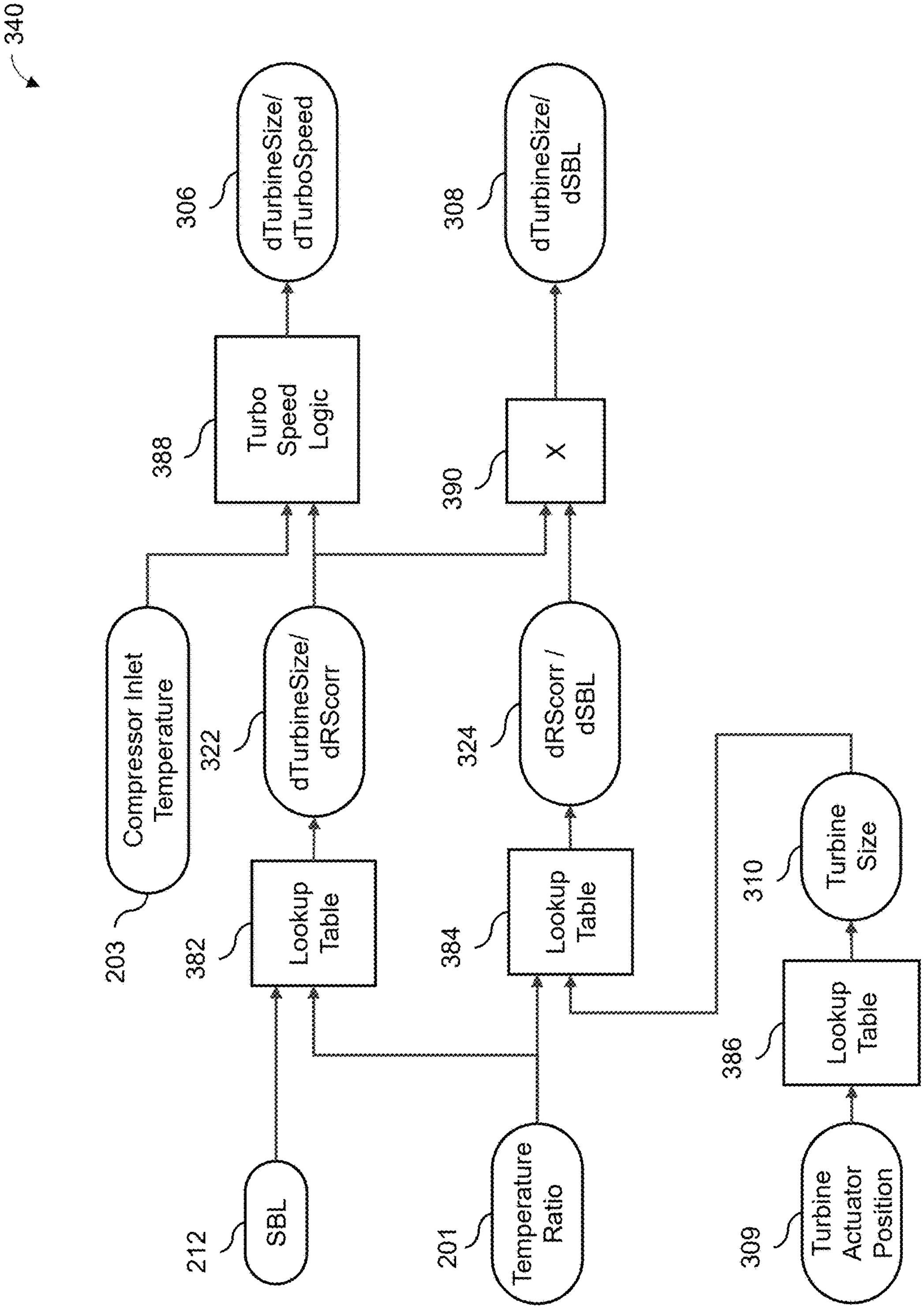

With reference to FIG. 4 there are illustrated additional aspects of linearization factor logic 340. SBL parameter 211 and temperature ratio 201 are provided as inputs to lookup table 382 which is configured to determine and output correlation factor 322 in response thereto. Lookup table 382 may be preconfigured values for correlation factor 322 which may be physics-based, empirically-based, and/or parameterization-based. Correlation factor 322 correlates change in turbine size with change corrected turbocharger speed (e.g., dTurbineSize/dRScorr). Compressor inlet temperature 203 and correlation factor 322 are provided as inputs to turbocharger speed logic 388 which is configured to determine and output linearization factor 306 in in response thereto. Turbocharger speed logic 388 may be preconfigured determine and output linearization factor 306 based on physics-based, empirically-based, and/or parameterization-based relationships between compressor inlet temperature 203 and correlation factor 322.

Turbine actuator position 309 is provided as input to lookup table 386 which is configured to determine and output turbine size 310 in response thereto. Turbine size 310 and temperature ratio 201 are provide as inputs to lookup table 384 which is configured to determine and output correlation factor 324 in response thereto. Lookup table 384 may be preconfigured values for correlation factor 324 which may be physics-based, empirically-based, and/or parameterization-based. Correlation factor 324 correlates change corrected turbocharger speed in with change in SBL parameter 211 (e.g., dRScorr/dSBL). Correlation factor 322 and correlation factor 324 are provided as inputs to multiplier 390 which is configured to determine and output linearization factor 308 in in response thereto.

It shall be appreciated that linearization factor 306 and linearization factor 308 may comprise physics-based linearization factors utilized to correlate changes in turbocharger speed or SBL to changes in turbine size (e.g., VGT position) and may be generated based on physical characteristics of the hardware (compressor/turbine maps etc . . . ) to reduce calibration and test cell effort. Additionally, utilizing SBL as a linearization factor couples changes in engine speed and EGR together to avoid overresponse from the controller.

Figure 5:
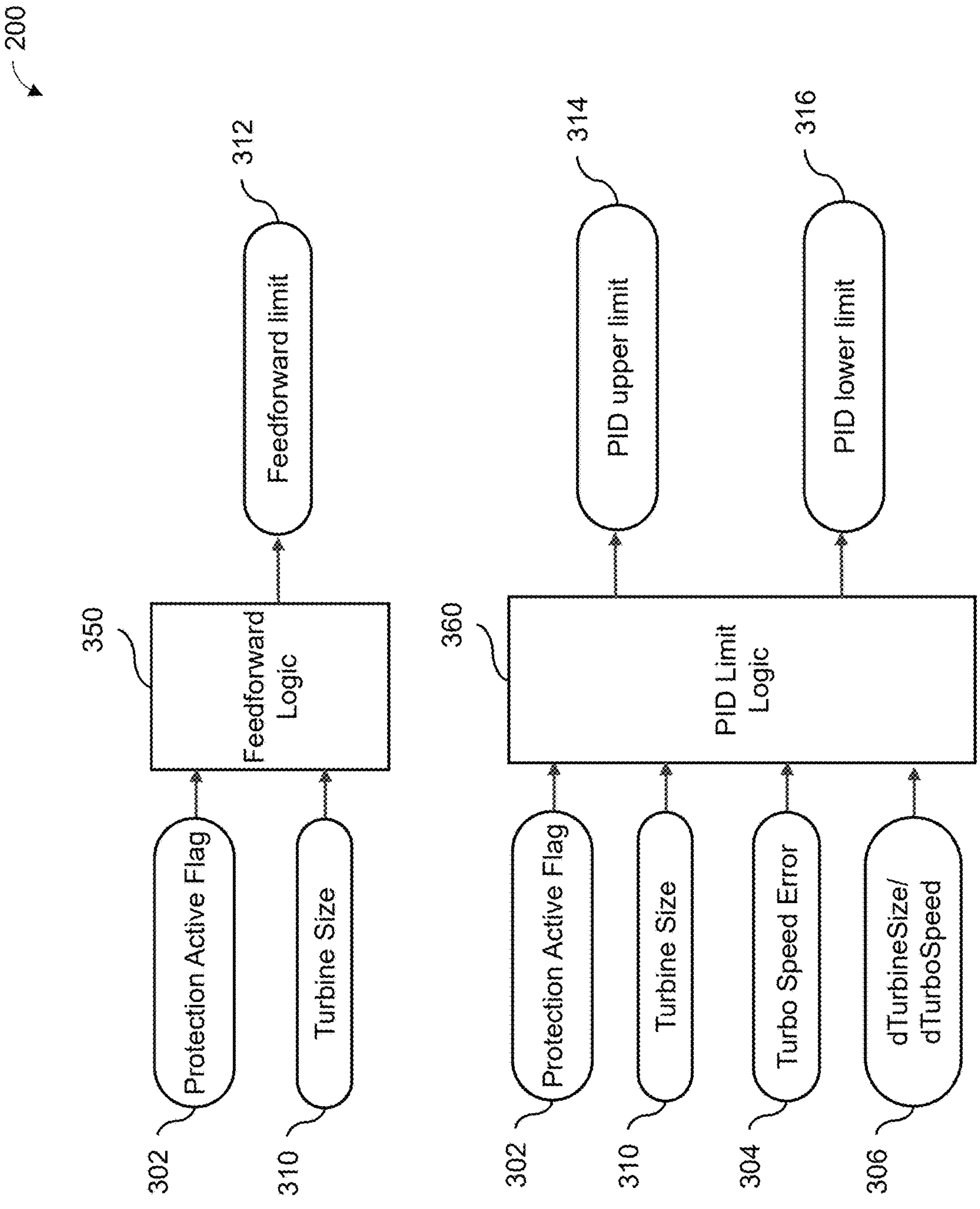

With reference to FIG. 5 there are illustrated additional aspects of controls 200. Protection active flag 302 and turbine size 310 are provided as inputs to feedforward logic 350 which is configured to determine and output feedforward limit 312 in response thereto. Feedforward limit 312 may sets an initial guess or estimate for turbine actuator limit 222. Feedforward logic 350 may be configured to determine feedforward limit using a lookup table or other predetermined relationship or correlation between protection active flag 302 and turbine size 310 and values of feedforward limit 312.

Protection active flag 302, turbine size 310, turbocharger speed error 304, and linearization factor 306 are provided as inputs to PID limit logic 360 which is configured to determine and output PID upper limit 314 and PID lower limit 316 in response thereto.

Figure 6:
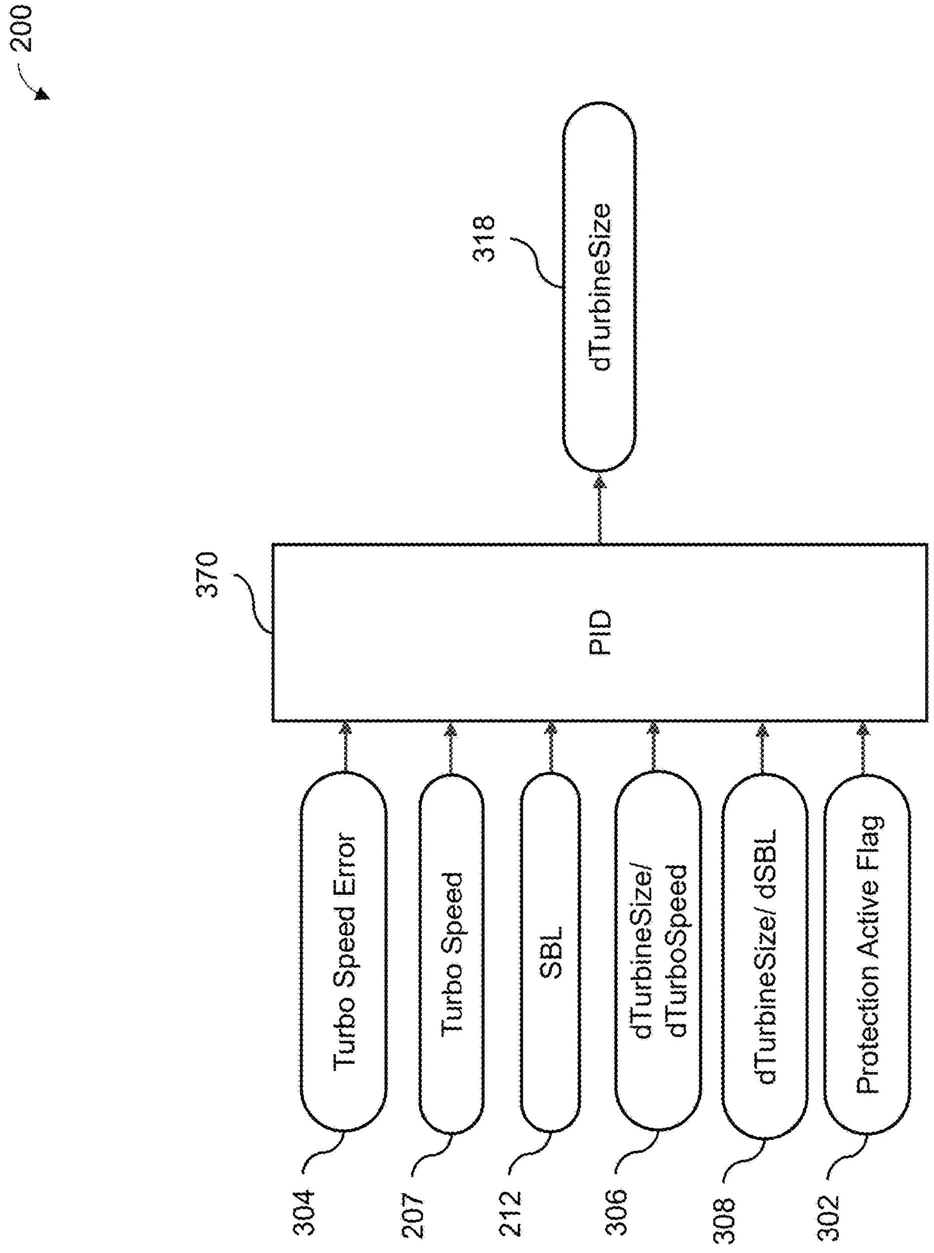

With reference to FIG. 6 there are illustrated additional aspects of controls 200. Turbocharger speed error 304, turbocharger speed 207, SBL parameter 211, linearization factor 306, linearization factor 308 and protection active flag 302 are provided as inputs to PID controller 370 which is configured to determine and output change in turbine size 318 (dTurbineSize) in response thereto.

Figure 7:
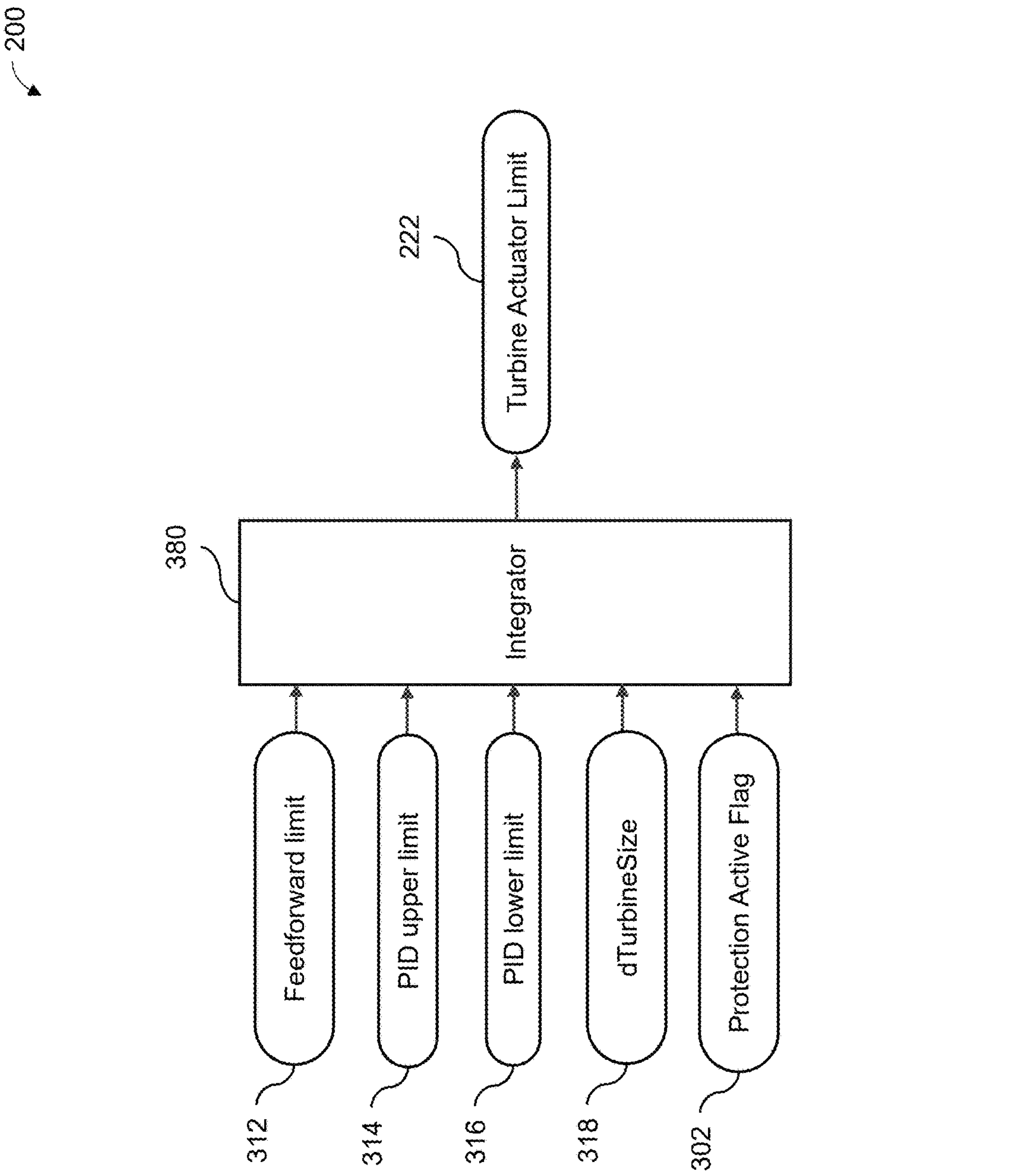

With reference to FIG. 7 there are illustrated additional aspects of controls 200. Feedforward limit 312, PID upper limit 314, PID lower limit 316, change in turbine size 318, and protection active flag 302 are provided as inputs to integrator 380 which is configured to determine and output turbine actuator limit in response thereto.

Figure 8:
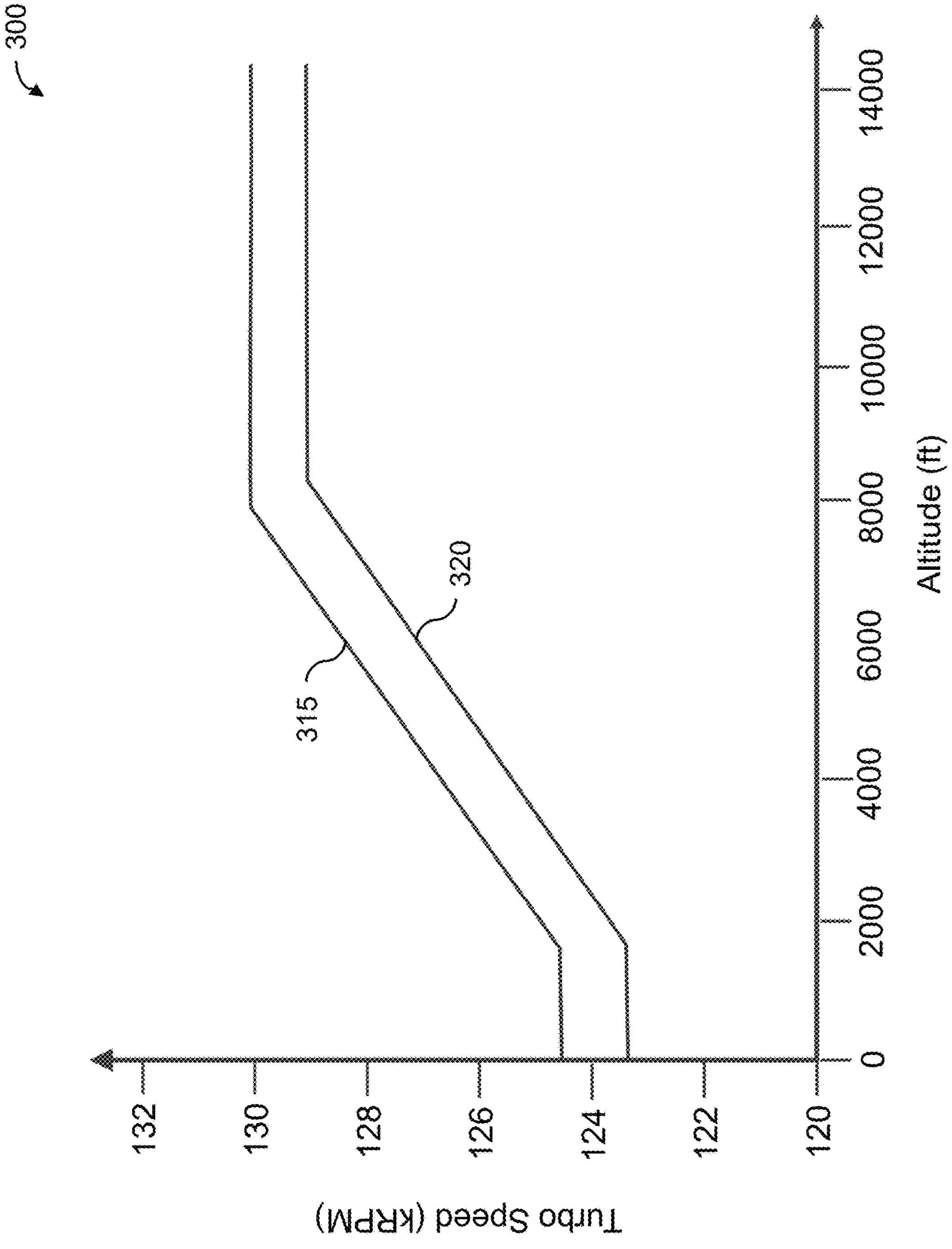
FIGS. 8-10 are graphs depicting certain aspects of example controls.

With reference to FIG. 8, there is illustrated a graph 300 depicting turbocharger speed on its vertical axis and altitude on its horizontal axis. Graph 300 further depicts curve 315 and curve 320. Curve 315 denotes a never to exceed limit on turbocharge speed which may be established, for example, based on safety, reliability, and/or other criteria. Curve 320 depicts a steady state tuning limit on turbocharger speed. By utilizing controls according to the present disclosure curve 320 can be set closer to curve 315 than is possible with other approaches, allowing controls according to the present disclosure to ride a turbocharger speed limit. In the illustrated example, curve 320 is depicted as a single magnitude offset from curve 315. It shall be appreciated, however, that curve 315 can vary in response to variation in steady state performance requirements and controller capability across a range of altitudes.

Figure 9:
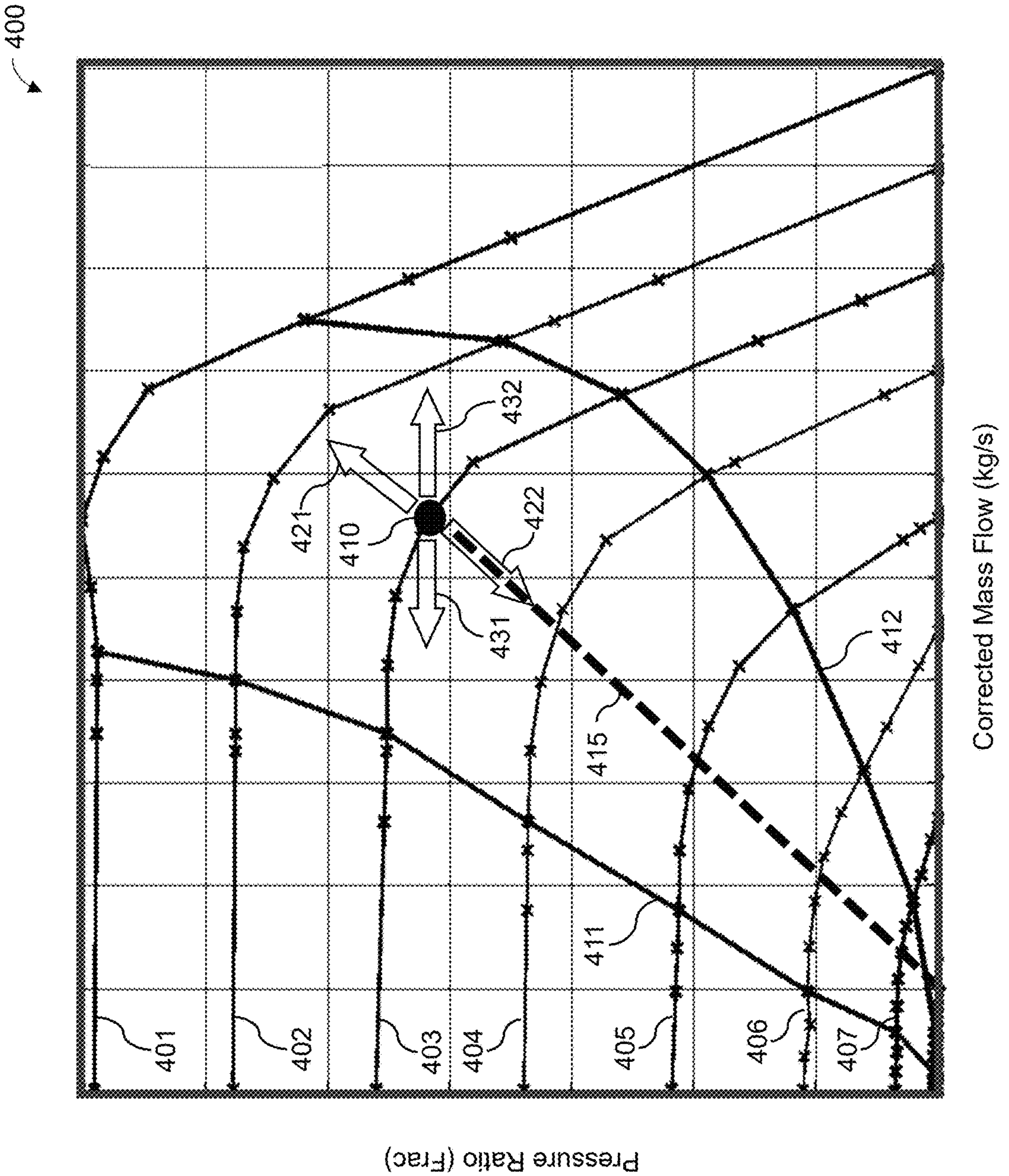

With reference to FIG. 9, there is illustrated a graph 300 depicting a turbocharger compressor operating map for a turbocharger according to the present disclosure. Graph 400 depicts pressure ratio on its vertical axis and corrected mass flow on its horizontal axis. Graph 400 depicts a plurality of lines of corrected turbocharge speed 401-407, a compressor surge boundary 411 and a compressor choke boundary 412. Graph 400 further depicts a compressor operating point 410 and a breathing line 415. Arrow 421 depicts a direction in which turbocharger speed increases relative to operating point 410. Arrow 422 depicts a direction in which turbocharger speed decreases relative to operating point 410. Arrow 431 depicts a direction in which a slope of breathing line 415 increases, for example if an intake air throttle opens, an EGR fraction decreases, or an engine speed increase. Arrow 432 depicts a direction in which a slope of breathing line 415 decreases, for example if an intake air throttle closes, an EGR fraction increases, or an engine speed decrease.

Figure 10:
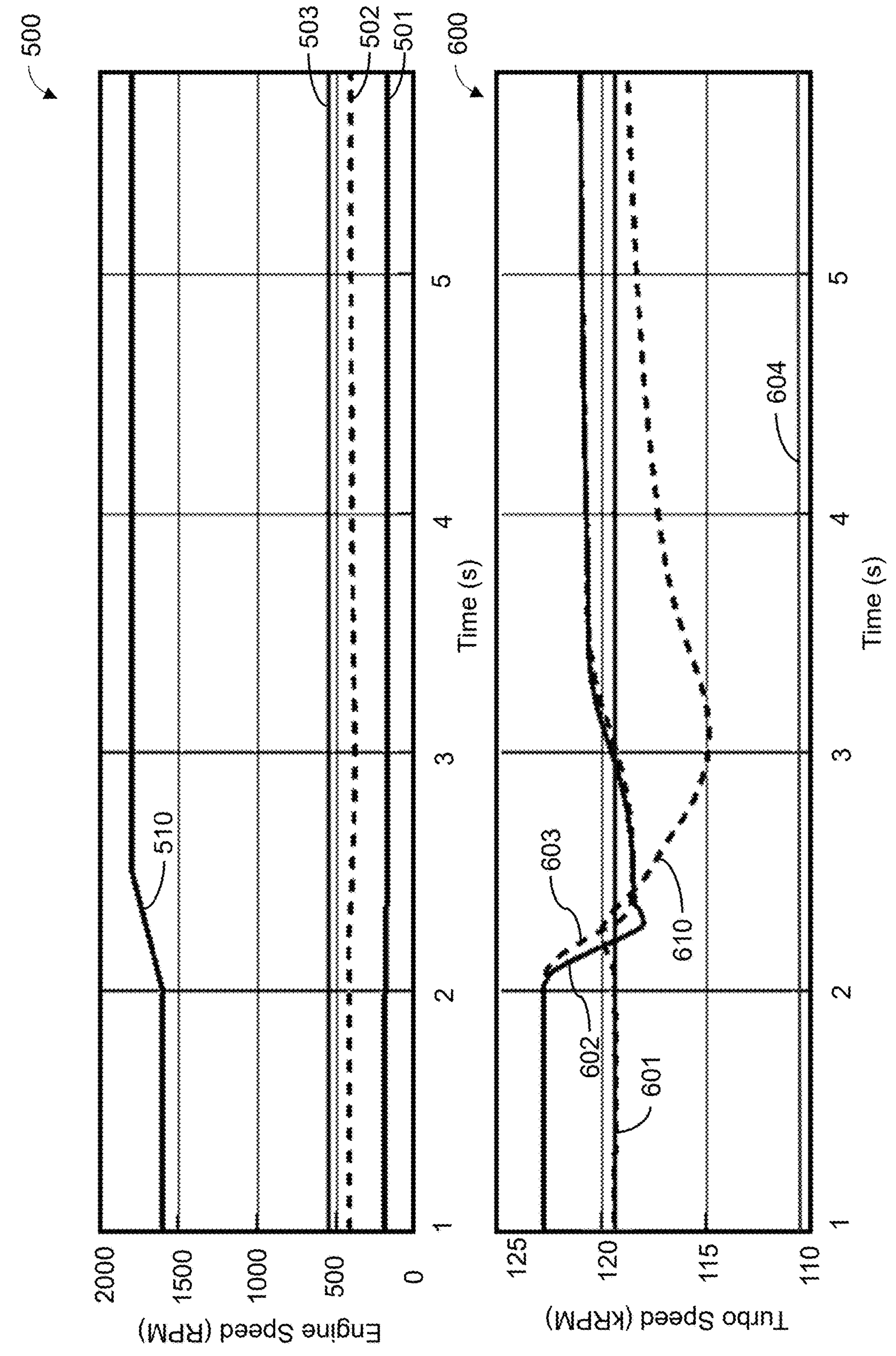

With reference to FIG. 10, there are illustrated graph 500 graph 600. Graph 500 depicts engine speed on its vertical axis and time on its horizontal axis and engine speed 510 as a function of time. At time 2 engine speed 510 increases. Graph 500 further depicts total fueling 501, exhaust pressure 502, and exhaust manifold pressure target 503 which remain substantially constant over the time span illustrated in FIG. 10.

Graph 600 depicts turbocharger speed on its vertical axis and time on its horizontal axis. Graph 600 further depicts turbocharger speed limit 601, turbine actuator position command 602, turbine actuator position 603, and turbocharger speed 610 as a function of time. Very soon after engine speed 510 begins to increase at time 2, turbine actuator position command 602 begins to proactively or predictively decrease. Turbine actuator position 603 and turbocharger speed 610 respond commensurately with a relative delay due to physical system response lag time. This proactive or predictive control action results in very little increase in turbocharger speed 610 and minimized overshoot of turbocharger speed limit 601. In contrast, a reactive control action wherein increase in turbocharger speed is utilized as a control input exhibits a slower response and a greater increase of turbocharger speed 610 relative to a target speed. It shall also be appreciated that turbine actuator position 602 overshoots the magnitude turbine actuator position 602 but quickly reduces the overshoot so that turbocharger speed limit 601 quickly converges with turbine actuator position 602.

Graph 600 also depicts EGR valve position 604 which remains substantially constant over the time span illustrated in FIG. 10. It shall be appreciated, however, that controls according to the present disclosure exhibit substantially similar responses to changes in EGR valve position 604 as to the illustrated changes in engine speed 510. Proactive or predictive controls according to the present disclosure may occur during any of a number of engine operating conditions. In some instances, a change in engine speed and/or EGR position may occur during compression braking operation of the engine while the turbocharger is being controlled to ride a turbocharger speed limit and proactive or predictive controls according to the present disclosure may substantially limit overshoot beyond this limit.

Figure 11:
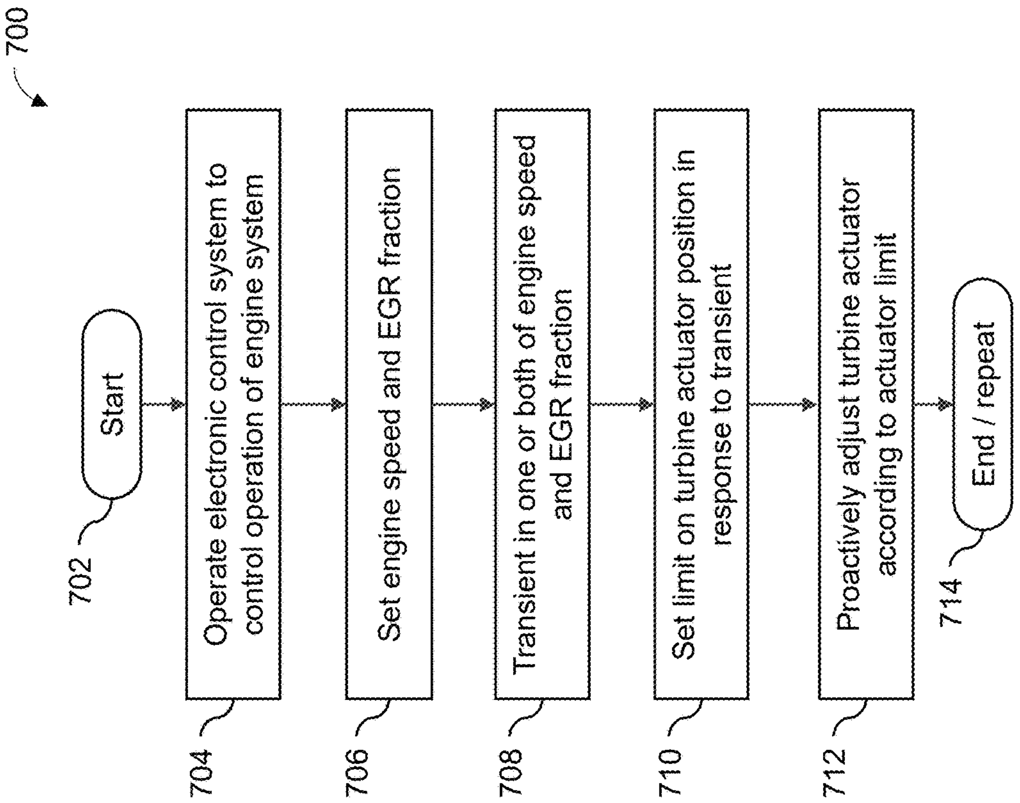
FIG. 11 is a flow diagram depicting certain aspects of an example process.

With reference to FIG. 11, there is illustrated an example process 700. Process 700 begins at start operation 702 and proceeds to operation 704 which operates an electronic control system to control operation of an engine system. The engine system may include an engine, a turbocharger including a turbine configured to receive exhaust from the engine and a compressor configured to supply intake air to an intake of the engine, a turbine actuator configured to adjust exhaust flow through the turbine, an EGR valve configured to variably recirculate exhaust to the intake of the engine, and an electronic control system in operative communication with the engine, the turbine actuator, and the EGR valve.

From operation 704, process 700 proceeds to operation 706 which sets operation of the engine at an engine speed and an EGR fraction and the turbocharger within a steady state speed limit. Such operation may include operating at or very close to (e.g., within 1-5% of) the steady state speed limit. From operation 706, process 700 proceeds to operation 708 which one or both of the engine speed and the EGR fraction experiences a transient. From operation 708, process 700 proceeds to operation 710 which sets an actuator limit on position of the turbine actuator in response to the transient. From operation 710, process 700 proceeds to operation 712 which proactively adjusts the turbine actuator according to the actuator limit in response to the transient. The adjusting limits turbocharger speed overshoot relative to a speed limit. From operation 712, process 700 proceeds to operation 714 which ends or repeats process 700.

As illustrated by this detailed description, the present disclosure contemplates a plurality of embodiments including the following non-limiting examples.

Example embodiment number 1 is a process comprising: operating an electronic control system to control operation of an engine system including an engine, a turbocharger including a turbine configured to receive exhaust from the engine and a compressor configured to supply intake air to an intake of the engine, a turbine actuator configured to adjust exhaust flow through the turbine, an EGR valve configured to variably recirculate exhaust to the intake of the engine, and an electronic control system in operative communication with the engine, the turbine actuator, and the EGR valve, wherein the operating comprises operating the engine at an engine speed and an EGR fraction and the turbocharger within a steady state speed limit, in response to the engine speed and the EGR fraction, setting an actuator limit on position of the turbine actuator; and in response to a change in one or both of the speed of the engine and the EGR fraction, proactively adjusting the turbine actuator according to the actuator limit prior to an increase in turbocharger speed, the adjusting limiting turbocharger speed overshoot relative to a speed limit.

Example embodiment number 2 includes the features of example embodiment number 1, wherein the setting the actuator limit comprises calculating a breathing line parameter in response to the engine speed and the EGR fraction, the breathing line parameter indicating volumetric flow passing through one or both of the turbine and the compressor of the turbocharger.

Example embodiment number 3 includes the features of example embodiment number 2, wherein the breathing line parameter comprises a breathing line slope that is proportional to the engine speed and inversely proportional to the EGR fraction.

Example embodiment number 4 includes the features of example embodiment number 2, wherein the setting the actuator limit on position of the turbine actuator comprises determining a first linearization factor correlating a change in effective turbine size with a change in turbocharger speed, and a second linearization factor correlating a change in effective turbine size with a change in the breathing line parameter.

Example embodiment number 5 includes the features of example embodiment number 2, wherein the breathing line parameter comprises a breathing line slope.

Example embodiment number 6 includes the features of example embodiment number 1, wherein the change in one or both of the speed of the engine and the EGR fraction occurs during compression braking operation of the engine.

Example embodiment number 7 includes the features of example embodiment number 1, wherein the turbocharger comprises a variable geometry turbocharger (VGT) and the turbine actuator comprises a VGT actuator.

Example embodiment number 8 is a system comprising: an engine; a turbocharger including a turbine configured to receive exhaust from the engine and a compressor configured to supply intake air to an intake of the engine; a turbine actuator configured to adjust exhaust flow through the turbine; an EGR valve configured to variably recirculate exhaust to the intake of the engine; and an electronic control system in operative communication with the engine, the turbine actuator, and the EGR valve, the electronic control system being configured to operate the engine at an engine speed and an EGR fraction and the turbocharger within a steady state speed limit, in response to the engine speed and the EGR fraction, set an actuator limit on position of the turbine actuator; and in response to a change in one or both of the speed of the engine and the EGR fraction, proactively adjust the turbine actuator according to the actuator limit prior to an increase in turbocharger speed effective to limit turbocharger speed overshoot relative to a speed limit.

Example embodiment number 9 includes the features of example embodiment number 8, wherein the electronic control system is configured to set the actuator limit by calculating a breathing line parameter in response to the engine speed and the EGR fraction, the breathing line parameter indicating volumetric flow passing through one or both of the turbine and the compressor of the turbocharger.

Example embodiment number 10 includes the features of example embodiment number 9, wherein the breathing line parameter comprises a breathing line slope that is proportional to the engine speed and inversely proportional to the EGR fraction.

Example embodiment number 11 includes the features of example embodiment number 9, wherein the electronic control system is configured to set the actuator limit on position of the turbine actuator by determining a first linearization factor correlating a change in effective turbine size with a change in turbocharger speed, and a second linearization factor correlating a change in effective turbine size with a change in the breathing line parameter.

Example embodiment number 12 includes the features of example embodiment number 9, wherein the breathing line parameter comprises a breathing line slope.

Example embodiment number 13 includes the features of example embodiment number 8, wherein the change in one or both of the speed of the engine and the EGR fraction occurs during compression braking operation of the engine.

Example embodiment number 14 includes the features of example embodiment number 8, wherein the turbocharger comprises a variable geometry turbocharger (VGT) and the turbine actuator comprises a VGT actuator.

Example embodiment number 15 is an apparatus for controlling operation of an engine system including an engine, a turbocharger including a turbine configured to receive exhaust from the engine and a compressor configured to supply intake air to an intake of the engine, a turbine actuator configured to adjust exhaust flow through the turbine, an EGR valve configured to variably recirculate exhaust to the intake of the engine, the apparatus comprising: one or more non-transitory memory media configured with instructions executable by one or more processors to perform acts of: operating the engine at an engine speed and an EGR fraction and the turbocharger within a steady state speed limit, in response to the engine speed and the EGR fraction, setting an actuator limit on position of the turbine actuator, and in response to a change in one or both of the speed of the engine and the EGR fraction, proactively adjusting the turbine actuator according to the actuator limit prior to an increase in turbocharger speed, the adjusting limiting turbocharger speed overshoot relative to a speed limit.

Example embodiment number 16 includes the features of example embodiment number 15, wherein the setting the actuator limit comprises calculating a breathing line parameter in response to the engine speed and the EGR fraction, the breathing line parameter indicating volumetric flow passing through one or both of the turbine and the compressor of the turbocharger.

Example embodiment number 17 includes the features of example embodiment number 16, wherein the breathing line parameter comprises a breathing line slope that is proportional to the engine speed and inversely proportional to the EGR fraction.

Example embodiment number 18 includes the features of example embodiment number 16, wherein the setting the actuator limit on position of the turbine actuator comprises determining a first linearization factor correlating a change in effective turbine size with a change in turbocharger speed, and a second linearization factor correlating a change in effective turbine size with a change in the breathing line parameter.

Example embodiment number 19 includes the features of example embodiment number 16, wherein the breathing line parameter comprises a breathing line slope.

Example embodiment number 20 includes the features of example embodiment number 15, comprising the engine system operatively coupled with the apparatus.

It shall be appreciated that terms such as "a non-transitory memory," "a non-transitory memory medium," and "a non-transitory memory device" refer to a number of types of devices and storage mediums which may be configured to store information, such as data or instructions, readable or executable by a processor or other components of a computer system and that such terms include and encompass a single or unitary device or medium storing such information, multiple devices or media across or among which respective portions of such information are stored, and multiple devices or media across or among which multiple copies of such information are stored.

It shall be appreciated that terms such as "determine," "determined," "determining" and the like when utilized in connection with a control method or process, an electronic control system or controller, electronic controls, or components or operations of the foregoing refer inclusively to a number of acts, configurations, devices, operations, and techniques including, without limitation, calculation or computation of a parameter or value, obtaining a parameter or value from a lookup table or using a lookup operation, receiving parameters or values from a datalink or network communication, receiving an electronic signal (e.g., a voltage, SENT, current, or pulse-width modulation (PWM) signal) indicative of the parameter or value, receiving output of a sensor indicative of the parameter or value, receiving other outputs or inputs indicative of the parameter or value, reading the parameter or value from a memory location on a computer-readable medium, receiving the parameter or value as a run-time parameter, and/or by receiving a parameter or value by which the interpreted parameter can be calculated, and/or by referencing a default value that is interpreted to be the parameter value.

While example embodiments of the disclosure have been illustrated and described in detail in the drawings and foregoing description, the same is to be considered as illustrative and not restrictive in character, it being understood that only certain example embodiments have been shown and described and that all changes and modifications that come within the spirit of the claimed inventions are desired to be protected. It should be understood that while the use of words such as preferable, preferably, preferred or more preferred utilized in the description above indicates that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. A process comprising:

operating an electronic control system to control operation of an engine system including an engine, a turbocharger including a turbine configured to receive exhaust from the engine and a compressor configured to supply intake air to an intake of the engine, a turbine actuator configured to adjust exhaust flow through the turbine, an EGR valve configured to variably recirculate exhaust to the intake of the engine, and an electronic control system in operative communication with the engine, the turbine actuator, and the EGR valve, wherein the operating comprises operating the engine at an engine speed and an EGR fraction, operating the turbocharger within a steady state speed limit, in response to the engine speed and the EGR fraction, setting an actuator limit on a position of the turbine actuator; and in response to a change in one or both of the speed of the engine and the EGR fraction, proactively adjusting the turbine actuator according to the actuator limit prior to an increase in turbocharger speed, thereby limiting turbocharger speed overshoot relative to a speed limit.

2. The process of claim 1, wherein setting the actuator limit comprises calculating a breathing line parameter in response to the engine speed and the EGR fraction, the breathing line parameter indicating volumetric flow passing through one or both of the turbine and the compressor of the turbocharger.

3. The process of claim 2, wherein the breathing line parameter comprises a breathing line slope that is proportional to the engine speed and inversely proportional to the EGR fraction.

4. The process of claim 2, wherein setting the actuator limit on the position of the turbine actuator comprises determining a first linearization factor correlating a change in effective turbine size with a change in turbocharger speed, and a second linearization factor correlating a change in effective turbine size with a change in the breathing line parameter.

5. The process of claim 2, wherein the breathing line parameter comprises a breathing line slope.

6. The process of claim 1, wherein the change in one or both of the speed of the engine and the EGR fraction occurs during compression braking operation of the engine.

7. The process of claim 1, wherein the turbocharger comprises a variable geometry turbocharger (VGT) and the turbine actuator comprises a VGT actuator.

8. A system comprising:
an engine;
a turbocharger including a turbine configured to receive exhaust from the engine and a compressor configured to supply intake air to an intake of the engine;
a turbine actuator configured to adjust exhaust flow through the turbine;
an EGR valve configured to variably recirculate exhaust to the intake of the engine; and
an electronic control system in operative communication with the engine, the turbine actuator, and the EGR valve, the electronic control system being configured to
operate the engine at an engine speed and an EGR fraction,
operating the turbocharger within a steady state speed limit,
in response to the engine speed and the EGR fraction, set an actuator limit on a position of the turbine actuator; and
in response to a change in one or both of the speed of the engine and the EGR fraction, proactively adjust the turbine actuator according to the actuator limit prior to an increase in turbocharger speed effective to limit turbocharger speed overshoot relative to a speed limit.

9. The system of claim 8, wherein the electronic control system is configured to set the actuator limit by calculating a breathing line parameter in response to the engine speed and the EGR fraction, the breathing line parameter indicating volumetric flow passing through one or both of the turbine and the compressor of the turbocharger.

10. The system of claim 9, wherein the breathing line parameter comprises a breathing line slope that is proportional to the engine speed and inversely proportional to the EGR fraction.

11. The system of claim 9, wherein the electronic control system is configured to set the actuator limit on position of the turbine actuator by determining a first linearization factor correlating a change in effective turbine size with a change in turbocharger speed, and a second linearization factor correlating a change in effective turbine size with a change in the breathing line parameter.

12. The system of claim 9, wherein the breathing line parameter comprises a breathing line slope.

13. The system of claim 8, wherein the change in one or both of the speed of the engine and the EGR fraction occurs during compression braking operation of the engine.

14. The system of claim 8, wherein the turbocharger comprises a variable geometry turbocharger (VGT) and the turbine actuator comprises a VGT actuator.

15. An apparatus for controlling operation of an engine system including an engine, a turbocharger including a turbine configured to receive exhaust from the engine and a compressor configured to supply intake air to an intake of the engine, a turbine actuator configured to adjust exhaust flow through the turbine, an EGR valve configured to variably recirculate exhaust to the intake of the engine, the apparatus comprising:
one or more non-transitory memory media configured with instructions executable by one or more processors to perform acts of:
operating the engine at an engine speed and an EGR fraction,
operating the turbocharger within a steady state speed limit,
in response to the engine speed and the EGR fraction, setting an actuator limit on a position of the turbine actuator, and
in response to a change in one or both of the speed of the engine and the EGR fraction, proactively adjusting the turbine actuator according to the actuator limit prior to an increase in turbocharger speed, thereby limiting turbocharger speed overshoot relative to a speed limit.

16. The apparatus of claim 15, wherein setting the actuator limit comprises calculating a breathing line parameter in response to the engine speed and the EGR fraction, the breathing line parameter indicating volumetric flow passing through one or both of the turbine and the compressor of the turbocharger.

17. The apparatus of claim 16, wherein the breathing line parameter comprises a breathing line slope that is proportional to the engine speed and inversely proportional to the EGR fraction.

18. The apparatus of claim 16, wherein setting the actuator limit on position of the turbine actuator comprises determining a first linearization factor correlating a change in effective turbine size with a change in turbocharger speed, and a second linearization factor correlating a change in effective turbine size with a change in the breathing line parameter.

19. The apparatus of claim 16, wherein the breathing line parameter comprises a breathing line slope.

20. The apparatus of claim 15, comprising the engine system operatively coupled with the apparatus.

* * * * *